United States Patent
Koutrika et al.

(10) Patent No.: US 10,740,406 B2
(45) Date of Patent: Aug. 11, 2020

(54) MATCHING OF AN INPUT DOCUMENT TO DOCUMENTS IN A DOCUMENT COLLECTION

(71) Applicant: Hewlett-Packard Development Company, L.P., Fort Collins, CO (US)

(72) Inventors: Georgia Koutrika, Palo Alto, CA (US); Dimitra Papadimitriou, Palo Alto, CA (US); Steven J Simske, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 316 days.

(21) Appl. No.: 15/100,918

(22) PCT Filed: Dec. 6, 2013

(86) PCT No.: PCT/US2013/073680
§ 371 (c)(1),
(2) Date: Jun. 1, 2016

(87) PCT Pub. No.: WO2015/084404
PCT Pub. Date: Jun. 11, 2015

(65) Prior Publication Data
US 2016/0299891 A1    Oct. 13, 2016

(51) Int. Cl.
*G06F 16/93* (2019.01)
*G06F 16/2457* (2019.01)
(Continued)

(52) U.S. Cl.
CPC ........ *G06F 16/93* (2019.01); *G06F 16/24578* (2019.01); *G06F 40/20* (2020.01); *G06F 40/205* (2020.01)

(58) Field of Classification Search
None
See application file for complete search history.

(56) References Cited

U.S. PATENT DOCUMENTS 8,135,711 B2    3/2012    Charnock et al.
8,180,722 B2    5/2012    John et al.
(Continued)

FOREIGN PATENT DOCUMENTS

EP    1315096 B1    5/2003

OTHER PUBLICATIONS

Tf-ldf and Cosine similarity, Jana Vembunarayanan / Oct. 27, 2013, https://janav.wordpress.com/2013/10/27/tf-idf-and-cosine-similarity/ (Year: 2013).*
(Continued)

*Primary Examiner* — Robert W Beausoliel, Jr.
(74) *Attorney, Agent, or Firm* — HP Inc. Patent Department

(57) ABSTRACT

Matching of an input document to documents in a document collection is described herein. In an example, a similarity correspondence between an input document and one or more documents in a base document collection is established. A set of base document segments and a set of message types associated to document segments in the set of base document segments is provided. The set of base document segments is derived from documents in the base document collection. The input document is segmented into input document segments corresponding to message types. Segment similarity between input document segments and base document segments corresponding to the same message types is computed. The similarity correspondence between the input document and at least one document in the base document collection is based on the computed segment similarity.

14 Claims, 6 Drawing Sheets

(51) Int. Cl.
*G06F 40/20* (2020.01)
*G06F 40/205* (2020.01)

(56) References Cited

U.S. PATENT DOCUMENTS

| | | | |
|---|---|---|---|
| 8,781,813 B2* | 7/2014 | Cooper | G06F 17/275 704/9 |
| 2002/0138337 A1* | 9/2002 | Yanase | G09B 7/00 |
| 2004/0193584 A1 | 9/2004 | Ogawa et al. | |
| 2008/0077570 A1 | 3/2008 | Tang et al. | |
| 2011/0055332 A1 | 3/2011 | Stein | |
| 2011/0093462 A1 | 4/2011 | Meyer | |
| 2013/0054612 A1 | 2/2013 | Danielyan et al. | |

OTHER PUBLICATIONS

Chaudhuri, S. et al, "Mining Document Collections to Facilitate Accurate Approximate Entity Matching", Aug. 24-28, 2009.
Davison, B.D, "Adversarial Information Retrieval on the Web AIRWeb 2005", May 10, 2005.
Metzler, D et al, "Similarity Measures for Short segments of Text", Jan. 3, 2007.
Wang, X et al, "Document Clustering via Matrix Representation", Oct. 8, 2011.

* cited by examiner

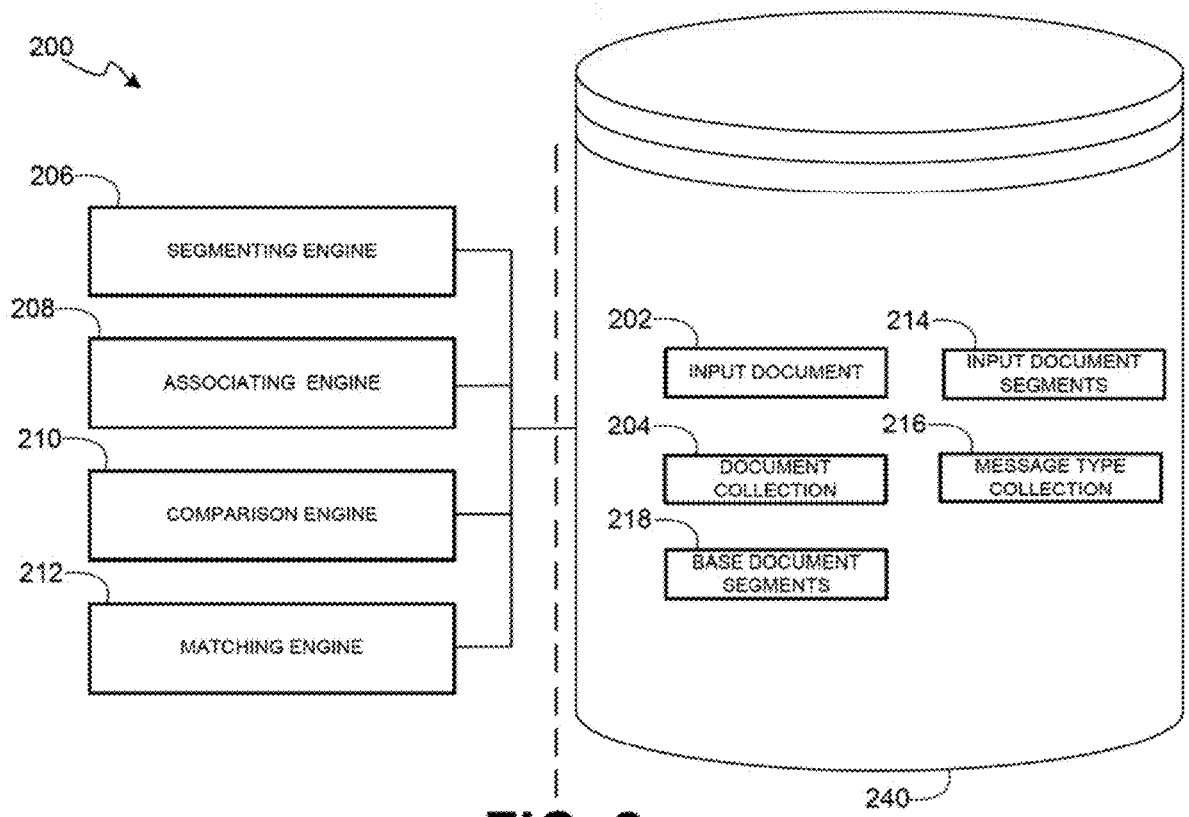

MATCHING OF AN INPUT DOCUMENT TO DOCUMENTS IN A DOCUMENT COLLECTION

BACKGROUND

Documents are generated at a far greater rate today than ever before. The proliferation of documents is due primarily to increased access to information technology and is unlikely to cease.

This proliferation of documents may become a large burden on the average consumer of information. One of the main challenges is access to needed information. Therefore, significant efforts are being made in the field of information retrieval and information extraction.

The goal of information retrieval is to permit document databases to be searched. Information extraction focuses on identifying predetermined types of information as new documents are entered into a document collection. An application of information retrieval and extraction is matching of documents. For example, a new entry by a forum user can be matched to existing entries that may contain relevant information for the forum user.

BRIEF DESCRIPTION OF THE DRAWINGS

In order that the present disclosure may be well understood, various examples will now be described with reference to the following drawings.

FIG. 2 depicts a system for document matching according to examples.

FIG. 3 depicts segmentation of an input document into document segments.

DETAILED DESCRIPTION

Figure 1:
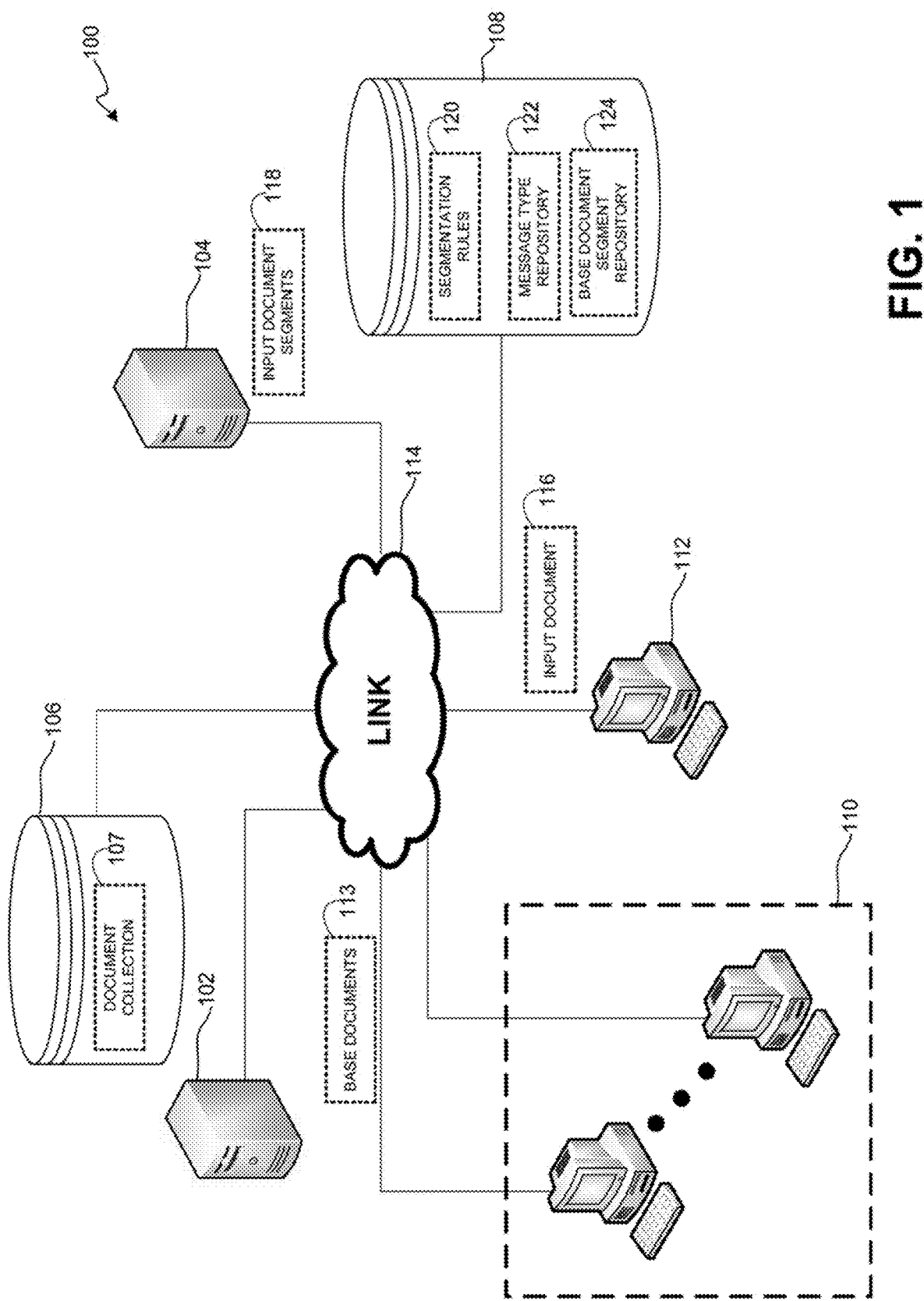
FIG. 1 depicts an environment in which various examples may be implemented.

In the following description, numerous details are set forth to provide an understanding of the examples disclosed herein. However, it will be understood that the examples may be practiced without these details. While a limited number of examples have been disclosed, it should be understood that there are numerous modifications and variations therefrom. Similar or equal elements in the Figures may be indicated using the same numeral.

Introduction:

As set forth above, information retrieval and extraction can be used to match documents. For example, keyword searching techniques may be used to search a document in a collection that is similar to an input document. As used herein, a document collection refers to a group of documents accumulated in one store location or distributed among multiple locations, the documents being linked by some purpose or resulting from the same process. Examples of document collections include, but are not limited to, documents generated by an organization, documents accessible by a common entry point (e.g. internet), documents in a database related to a similar topic, or user entries in forums (e.g., support or review sites), just to mention a few.

In many domains such as, but not limited to, forums, review sites, or electronic mail, keyword searching techniques may offer unsatisfactory results since, although such techniques might recognize and match keywords or concepts, they might ignore how these keywords are actually used to convey a message.

User forums can be considered for illustration. Forums are web sites where users may describe problems in order to receive suggestions to solve them. For example, a user may be looking for forum posts (i.e., documents) about problems with software updates. However, keyword matching techniques may return posts that also describe requests for software. In other words, the user input post intends to communicate that a problem is to be solved. However, keyword matching techniques may return posts that are related to other types of messages, e.g. requests for specific software.

In some cases, keyword search may be insufficient to explore past threads and discovering solutions from existing answers. Thereby, threads about the same or similar problems may be inaccessible to users. Furthermore, some types of document (e.g., user posts) tend to be free-form, prone to jargon and unstructured, making the above problems even more severe.

In examples herein, document matching is performed by taking into account the type of message that different portions of a document intend to communicate. More specifically, and according to at least some of the examples herein, an input document is segmented based on the type of message being intended to communicate so as to generate document segments corresponding to different message types.

As used herein, a document refers to a piece of information corresponding to a single record (e.g. an entry in a forum, an email, a user review, a press record, etc) that is processable by a computer. In other words, a document is considered as a repository for a snippet of natural language in any medium which can be accessed using a computer after it is created. A document is not limited to a text document and may include any information media such as text, graphics or sound. Generally, for a non-text data document, text recognition may be applied to generate text onto which examples described herein may be applied. Generally, examples herein may apply a pre-processing for extracting information from documents. For example, an OCR processing may be applied to scanned images of documents in order to extract the document information. Similarly, speech recognition may be applied to an audio document for extracting the document information.

As used herein, a document segment refers to a portion of a document. By segmenting a document based on the type of message, it is facilitated identifying which parts of a document correspond to different user's intent. A document segment does not necessarily correspond to subsequent parts of a document, but may be composed of intercalated parts.

Document segments corresponding to different message types can be identified as communication strata. Communication strata in a document represent the different portions of a document that users use to communicate. Communication strata may be used to represent different parts of a document. Further, communication strata may be used to match documents based on the actual message that a user is intending to communicate.

The concept of communication stratum is different to that of subtopic, which relates to a document segment corresponding to different subjects in a document. Generally, subtopics may be identified by keywords. The difference between communication stratum and subtopic is illustrated with the following example. In the example, document portions correspond to posts of a forum regarding a user problem. Table 1 show document segments p1 to p4 and the corresponding subtopics and communication strata.

TABLE 1

| Segment | Document Portions | Subtopics | Communication Strata |
|---|---|---|---|
| p1 | . . . I need a software application to do this automatically . . . | Automatic, software | User request for software |
| p2 | . . . I pressed Ctrl-Alt-delete but my screen was still freezed so I had to press the power button. This didn't work so I unplugged the computer but when I turned it on again I got a blue screen . . . | Screen, press | Description of performed actions to solve the problem |
| p3 | I need to buy a new screen for my PC. Any ideas about if it is worthwhile to buy XXX. It is one of the most expensive screens in the market . . . | Screen | User request: opinion about . . . |
| p4 | The automatic update of XXX is popping up every time I want to install a new software. The first time . . . | Automatic, software | Problem description about . . . |

As illustrated by Table 1, document segments p1-p4 may correspond to the same subtopics (identified by keywords). However, document segments p1-p4 correspond to different communication strata. More specifically, they correspond to different messages intended to be communicated by a user. As illustration, examples of different messages intended to be communicated (i.e., communication strata) that may be found in a problem post include, among others, (i) the problem itself, (ii) unsuccessful actions of the user, or (iii) user requests from the community using the forum.

As further illustration, examples of different messages intended to be communicated (i.e., communication strata) that may be found in a review post include, among others, (i) the product, (ii) the complaint, or (iii) the user request from the community using the forum.

As illustrated in examples herein, finding similarities between segments belonging to the same communication strata facilitates the matching of documents. As used herein, matching of documents refers to create a correspondence between an input document and one or more documents in a document collection. In some examples, matching includes searching for documents in a collection that are similar to an input document. The required similarity for a positive match may depend on the specific application.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Environment:

FIG. 1 depicts an environment 100 in which various examples may be implemented. Environment is shown to include a document collection server 102, a document matching server 104, a document collection data store 106, a matching data store 108, client devices 110, and an input user device 112 connected via link 114.

Document collection server 102 represents generally any computing device or combination of computing devices configured to allow client devices 110 and input user device 112 to enter a document into a document collection 107 to be stored in document collection data store 106. For example, document collection 107 may correspond to entries in a forum; document collection server 102 may manage forum entries uploaded by any of client devices 110 and input user device 112; forum entries may be then stored in document collection data store 106.

Document matching server 104 represents generally any computing device or combination of computing devices configured to match an input document 116 entered by input user device 112 with respect to document collection 107 from entries generated by client devices 110. To match input document 116, document matching server 104 may segment input document 116 into input document segments based on the type of message being intended to communicate. Thereby, the document segments correspond to message types and they can be referred to as communication strata, as set forth above. The segmentation may be performed by applying segmentation rules 120 stored in matching data store 108. Further details on how matching server 104 may perform the segmentation are illustrated below with respect to FIG. 7.

Document matching server 104 may also be responsible for generating a message type repository 122 and a based document segment repository 124. These repositories may be generated using, for example, an offline processing of document collection 107 as illustrated below with respect to FIG. 8.

After the segmentation, document matching server 104 may associate input document segments 118 to message types. For example, document matching server 104 may apply a classification or clustering of input document segments 118 according to associated message types. The associated message types may correspond to message type repository 122. Further, document matching server 104 may compare input document segments 118 with other document segments corresponding to the same message type so as to assess similarities between document segments. The document segments are stored in base document segments repository 124 stored in data store 108 and are extracted from documents in document collection 107. Such similarities may be then used to match input document 116 with documents in document collection 107 based on message types conveyed by single segments in input document 116.

Link 114 represents generally one or more of a cable, wireless, fiber optic, or remote connections via a telecommunication link, an infrared link, a radio frequency link, or any other connectors or systems that provide electronic communication. Link 114 may include, at least in part, an intranet, the Internet, or a combination of both. Link 114 may also include intermediate proxies, routers, switches, load balancers, and the like.

It will be understood that the environment 100 is only illustrative and that it does not limit implementations of examples herein. For example, but not limited thereto, document collection server 102 and document matching server 104 may be combined in a single computing system or distributed in inter-connected computing systems (e.g., via a cloud implementation). Analogously, document collection data store 106 and matching data store 108 may be combined in a single store system or distributed in inter-connected store systems (e.g., via a cloud implementation).

Figure 4:
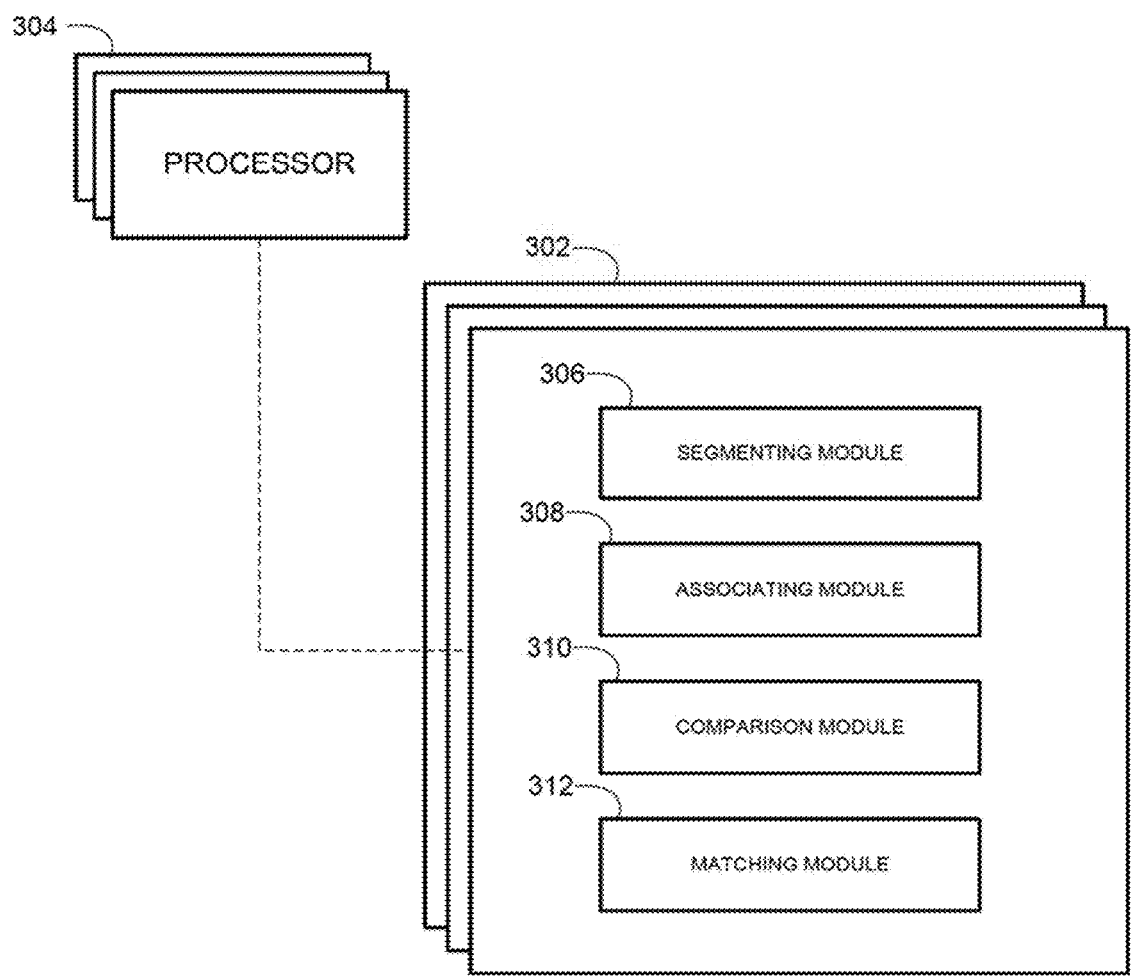
FIG. 4 depicts a system for document matching according to examples.

Components:

FIGS. 2 and 4 depict examples of physical and logical components for implementing various examples. FIG. 2 depicts a system 200 for automatically matching an input document 202 with a document collection 204. In the example of FIG. 2, system 200 includes a segmenting engine 206, an association engine 208, a comparison engine 210 and a matching engine 212.

Segmenting engine 206 represents generally any combination of hardware and programming configured to segment an input document 202 into input document segments based on the message being intended to communicate by each segment. Thereby, each of the document segments correspond to a different communication stratum. FIG. 3 illustrates segmentation of an input document 300 into document segments 300*a*, 300*b*, and 300*c* corresponding to different communication strata.

In FIG. 3, input document 300 corresponds to a post in a forum requesting a solution for a problem. Segmenting engine 206 segments post 300 into three communication strata, each stratum corresponding to one of the depicted document segments. FIG. 3 highlights document passages that match rules for segmentation applied by segmenting engine 206 for assessing correspondence of document segments based on message types, i.e. into communication strata.

In the first communication stratum, corresponding to document segment 300*a*, post 300 communicates a user problem, namely that a computer is not capable of ending processes. In the second communication stratum, corresponding to document segment 300*b*, post 300 communicates the efforts the user is performing to solve the problem (described in segment 300*a*). In the third communication stratum, corresponding to document segment 300*c*, post 300 communicates a request, namely a request for ideas to solve the problem stated in document segment 300*b* and going beyond the already user performed actions as described in document segment 300*b*.

It can be understood from FIG. 3 that a document segment may include integral document portions (e.g., document segments 300*b*, 300*c*) or intercalated document portions (e.g., document segments 300*a*). In other words, the segmentation criteria is not based on how information is distributed across the document but primarily on the message that different document portions intend to communicate.

The third communication stratum may seem trivial. However, if it is considered that there are users who ask for a specific product such as a software, others for a resource such as a user's guide or book, a web address, a substitution of a product, and/or instructions, it can be understood that a communication stratum specifying a user request is an important communication stratum.

In at least some examples herein, segmenting engine 206 uses segmentation rules (depicted in FIG. 8) to associate document segments to message types. Segmentation rules assist in identifying communication strata within input document 202. The segmentation rules may be a set of instructions stored in data store 240. The segmentation rules may be, for example, at least one of pre-determined rules or semi-supervised dynamically developed rules. Examples on how segmenting engine 206 implements segmenting rules are further set forth below with respect to FIG. 8.

Referring further to FIG. 2, associating engine 208 represents generally any combination of hardware and programming configured to classify the input document segments into message types from a message type collection 216. Message type collection 216 may correspond to communication strata from documents in document collections. For example, segmenting engine 206 may perform a pre-processing (also referred to as offline processing) in which documents in document collection 204 are segmented and communication strata are identified to generate message type collection 216. Document segments from document collection 204 may be stored as base document segments 218 into data store 240. This pre-processing may be cumulative in that input document segments 216 is extended as new documents are added to document collection 204 (for example, as new input posts are uploaded and processed in a post forum).

Comparison engine 210 represents generally any combination of hardware and programming configured to compute a similarity of input document segments 214 with base document segments associated to a base document collection. For example, comparison engine 210 may compare each input document segment 214 with base document segments 218 to identify similar segments. Thereby, comparison engine 210 may compute document segment similarities for each document segment and associate these similarities to documents in document collection 204.

Matching engine 212 represents generally any combination of hardware and programming configured to match input document 202 with at least one of the base documents in base document collection 204 on a ranking based on similarities computed by the comparison engine. Details on how matching engine 212 can generate such a ranking are illustrated with respect to FIG. 8.

In the foregoing discussion, various components were described as combinations of hardware and programming. Such components may be implemented in a number of fashions. Referring now to FIG. 4 the programming may be processor executable instructions stored on tangible memory media 302 and the hardware may include a processor 304 for executing those instructions. Memory 302 can be said to store program instructions that when executed by processor 48 implement system 200 of FIG. 2. Memory 302 may be integrated in the same device as processor 304 or it may be separate but accessible to that device and processor 304. Further, memory 302 may be integrated in a single memory device or distributed over multiple devices. Analogously, processor 304 may be integrated in a single processor device or distributed over multiple devices.

In an example, the program instructions can be part of an installation package that can be executed by processor 304 to implement system 200. In this case, memory 302 may be a portable medium such as a CD, DVD, or flash drive or memory maintained by a server from which the installation package can be downloaded and installed. In another example, the program instructions may be part of an application or applications already installed. Here, memory 302 can include integrated memory such as a hard drive. Further, memory 302 may include an operating system (not shown) and applications (not shown). The operating system includes a collection of programs that when executed by processor 304 serve as a platform on which the applications. Examples of operating systems include, but are not limited to, various versions of Microsoft's Windows® and Linux). The applications are program instructions that than when executed by processor 304 function as an application that performs the functionality stored in the modules described in the following.

In FIG. 4, the executable program instructions stored in memory 302 are depicted as segmenting module 306, associating module 308, comparison module 310, and matching module 312. Segmenting module 306 represents program instructions that when executed cause the implementation of segmenting engine 206 of FIG. 2. Likewise, associating module 308 represents program instructions that when executed cause the implementation of classifying engine 208 of FIG. 2. Likewise, comparison module 310 represents program instructions that when executed cause the implementation of comparison engine 210 of FIG. 2. Likewise, matching module 312 represents program instructions that when executed cause the implementation of segmenting engine 312 of FIG. 2.

Operation:

FIGS. 5 to 8 show flow diagrams for processing documents according to examples herein. In discussing these Figures, reference is made to the diagrams of FIGS. 1-3 to provide contextual examples. Implementation, however, is not limited to those examples. Again, such references are made simply to provide contextual examples.

Figure 5:
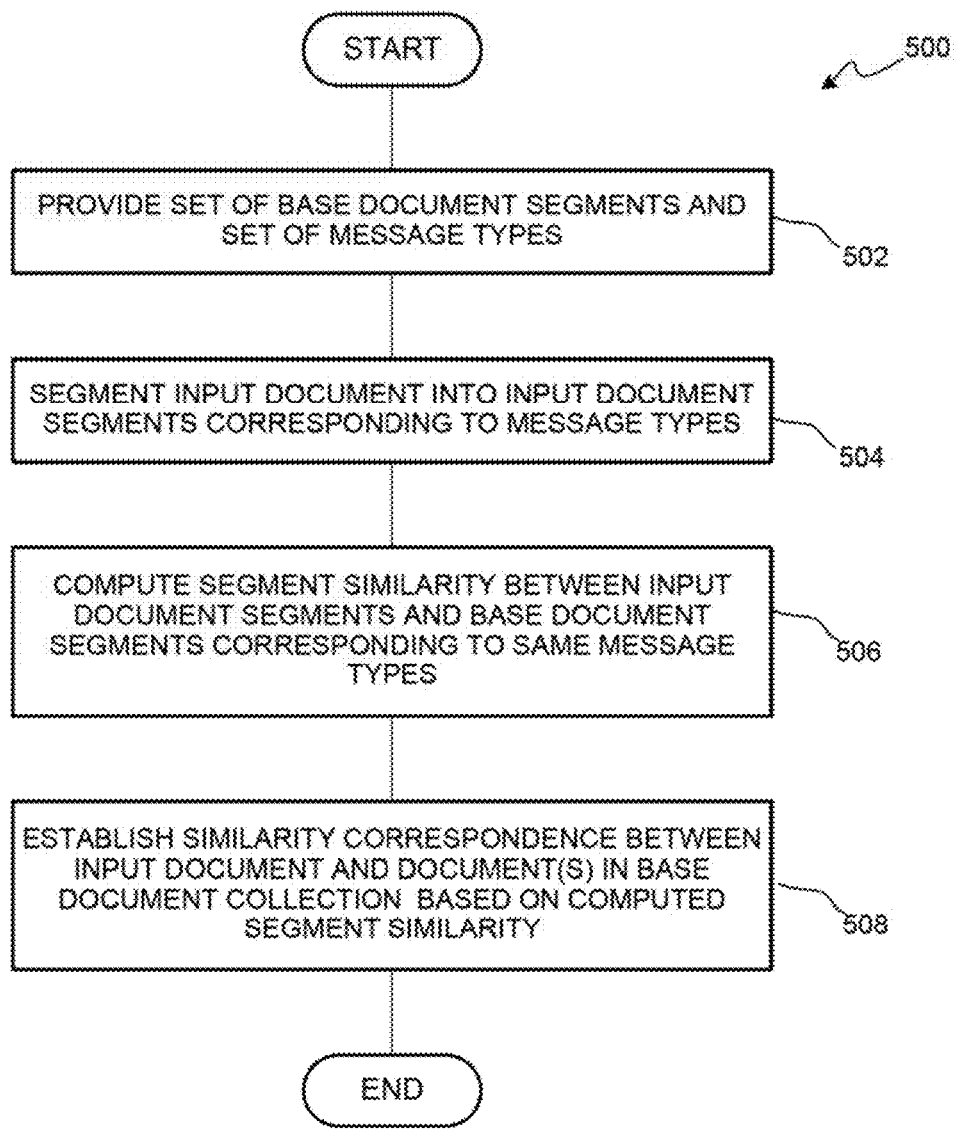
FIG. 5 depicts a flow diagram to establish a similarity correspondence between an input document and one or more documents in a base document collection according to examples.

FIG. 5 shows a flow diagram 500 to establish a similarity correspondence between an input document (e.g., input document 116 shown in FIG. 1) and one or more documents in a base document collection (e.g., document collection 107 shown in FIG. 1).

At block 502, a set of base documents segments and a set of message types are provided. The set of message types are associated to document segments in the set of base document segments. That is, each document segment is produced based on its correspondence to a message type so as to derive communication strata. The set of base document segments is derived from documents in a base document collection. The derivation of base document segments and base message types might form part of flow diagram 500 or may correspond to a pre-processing (also referred to as offline processing), as illustrated below with respect to FIG. 8. This derivation may include segmentation of documents in the document collection to generate the set of base document segments. This segmentation may be based on the same process flow applied to segment the input document at block 504. Providing the set of base documents segments and the set of message types may include a processor accessing a data store, as illustrated above with respect to FIG. 2.

At block 504, an input document is segmented into input document segments corresponding to message types. That is, at block 504, communication strata may be generated from an input document. In at least some examples herein, the segmentation at block 504 corresponds to the same procedure used to segment documents in the base document collection into the set of base document segments. There are a variety of approaches to segment input document segments. Some examples of segmentation are further illustrated below with respect to FIG. 6. Segmenting engine 206, shown in FIG. 2, may be responsible for the segmentation at block 504.

At block 506, a segment similarity is computed between input document segments and base document segments corresponding to same message types. In other words, a segment similarity is computed via an intra-strata comparison. That is, input document segments are compared to base document segments that intend to convey the same user message and from the comparison a similarity is computed.

It will be understood that there are a variety of approaches to compute segment similarities. Some examples of segment similarity computation are illustrated below with respect to FIG. 7. Comparison engine 210, shown in FIG. 2, may be responsible for implementing the computation at block 506.

At block 508, a similarity correspondence is established between the input document and at least one document in the base document collection based on the segment similarity computed at block 506. For example, base documents in the document collection may be ranked for similarity using a ranking function based on the computed document segment similarities. To perform the ranking, an aggregated score may be computed for each document based on a weighted sum of the computed segment similarities. User feedback might be involved to assign weights to the different message types (i.e., to different communication strata) to better meet user's specific needs.

Figure 6:
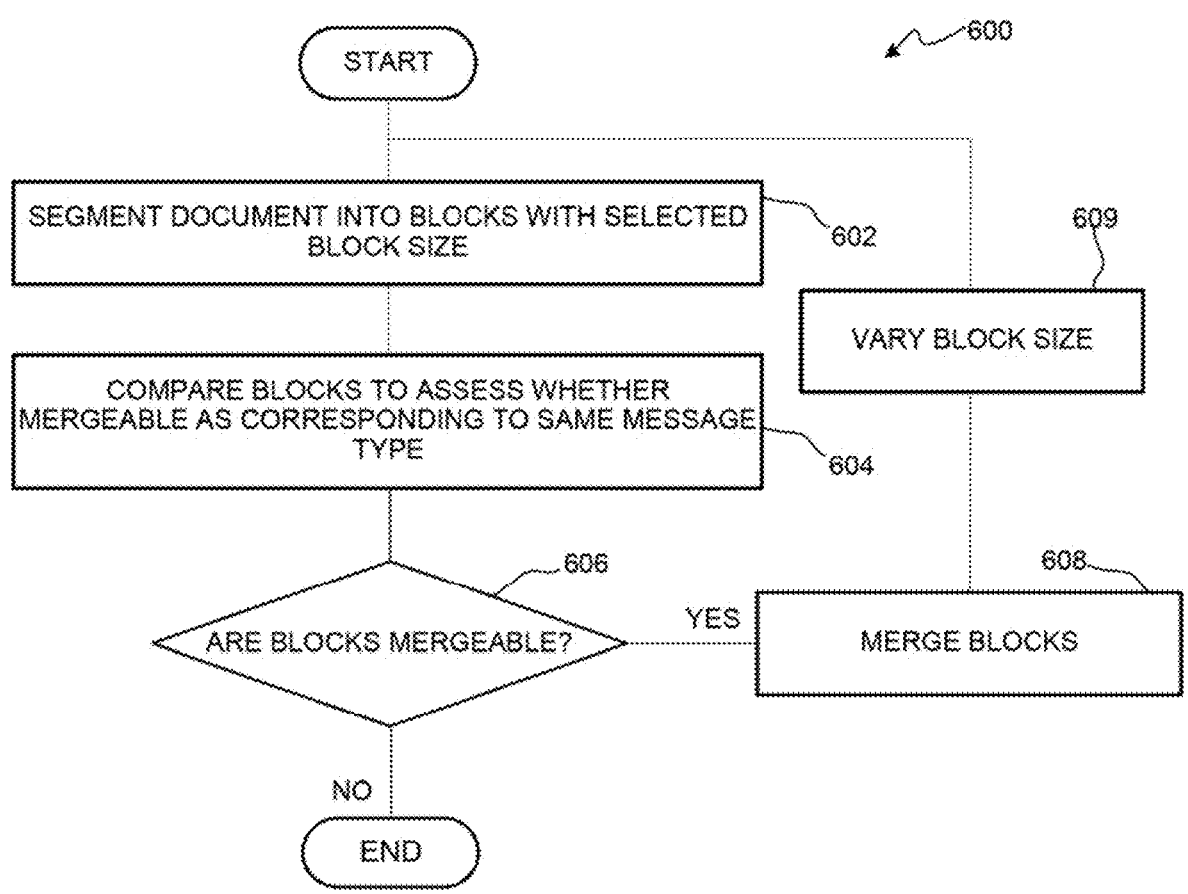
FIG. 6 depicts a flow diagram that illustrates examples to segment an input document into input document segments corresponding to message types.

FIG. 6 shows a flow diagram 600 that illustrates examples to segment an input document into input document segments corresponding to message types. Segmentation as illustrated by FIG. 6 may be performed to divide a document into segments. The generated input segments may be subsequently compared to base document segments to implement intra-strata comparison as further described in FIG. 8. Flow diagram 600 may be also applied to segment documents in a base document collection to generate base document segments (e.g., base document segment repository 124 shown in FIG. 1).

The segmentation performed by flow diagram 600 is aimed to generate document segments associated to communication strata, i.e. by establishing a correspondence to message types. This is in contrast to other segmentation techniques that may focus on subtopics, as set forth above. Document segments generated by flow diagram 600 may involve different topics but are aimed to belong to the same communication stratum. Therefore, blocks of flow diagram 600 may take into account at least on of syntactic, lexical, or semantic information that implies a shift to a different communication stratum within the input document. Further, flow diagram 600 may be based on a set of rules that are aimed to distinguish shifts in communication strata. For example, the following categories of rules might be applied in flow diagram 600 to distinguish communication strata.

(i) Previous actions performed by a user: This rule category aims to capture the effort of a user to solve a problem. Thereby, the user intent is not to get solutions that overlap with previous actions already performed or to provide a better understanding of the problem to a user communication. Rules in this category may include recognition of specific lexical sequential patterns that indicates a user intent to communicate previous actions, such as, for example, "I"+[verbal phrase] or "I tried to"+[verbal phrase].

(ii) Semantic and/or lexical relation with a document title: This rule category is based on the fact that users may include a short description of the main intent of a document in the title. For example, in a problem post in a forum, the title often includes a short description of the problem the user wants to solve. Therefore, a lexical similarity with the document title is a likely indication that a document segment is linked to the main intent of the user.

(iii) User request: This rule category aims to capture text passages in which a user describe a request by identifying common request clauses such as "any help will be appreciated," or "Does anyone know . . . ?"

It will be understood that the examples of rules above are merely illustrative. There is a variety of rules that might be applied. Which rules are applied depend, basically, on the context of the input document to be segmented. Generally, a set of syntactic, lexical, and semantic information rules can be designed by a pre-processing of a document collection associated to the input document (e.g., posts in a forum). Further, rules for implementing process flow 600 may be derived using a rule learning component that implements either explicit input from an expert that encodes these rules or semi-supervised approaches to automatically learn rules by processing a document collection. There may be rules that are domain-independent but there may be also rules that are domain-dependent.

In at least some of the examples herein, as illustrated by flow chart 600, the segmenting includes an iterative process that starts by an initial block selection and refines the selected block to identify segments in the input document that correspond to message types.

At block 602, a document is segmented into blocks with selected size. For example, consider a document as a series of tokens. As used herein, "token" refers to a string of one or more characters that is significant as a group. Examples of tokens include, but are not limited to a token a keyword, an operator or a punctuation mark. Tokens may be identified based on a set of specific rules that depends on the particular context of the document. Some methods used to identify tokens include: regular expressions, specific sequences of characters known as a flag, specific separating characters called delimiters, and explicit definition by a dictionary. Special characters, including punctuation characters, may be used to identify tokens because of their natural use in written languages.

Further, at block 602 the document can be divided into blocks using a variable window of size m over the tokens and a step of size s, which is equal or less than m. More specifically, the document can be divided in m consecutive tokens after the document is parsed into sequential tokens. Step size s represents a block size advancement offset. To determine block boundaries, a moving average may be computed for lexical classification. Using s-size block advancement, the block boundaries may be adjusted based on lexical chains identified in the lexical classification.

As illustration on how a lexical classification can be performed, a speech parser module may be used to identify the role of each token (lexical classification) and then identify lexical chains. Lexical chains refer to chains of tokens that need to be considered together (for example, an adjective followed by a noun should be kept together).

At block 604 blocks are compared to assess whether blocks generated at block 602 can be merged as corresponding to the same message type. For example, as the window is moved over document tokens, blocks may be compared to determine whether they correspond to the same message type, i.e. whether blocks belongs to the same communication stratum. These blocks may be overlapping or adjacent. There are a number of options for implementing such a block comparison. In an example, a similarity metric may be computed to compare adjacent blocks. Alternatively, or in addition thereto, topic change detection techniques may be applied to assess whether blocks belong to the same topic. In such examples, topics of document blocks are used as an indication of communication strata. However, as set forth above a communication stratum goes beyond merely topic communication. Alternatively, or in addition to similarity metrics and/or topic change detection, coherence between adjacent blocks may be measured by, for example, latent similarity analysis (LSA). Further thereto, other methods for information comparison might be applied such as, but not limited to, graphical or lexical chain methods.

The above comparison methods may be combined to implement a consensus mechanism. In the consensus mechanism, a consensus may be reached by, for example, (i) using a prioritized criteria satisfaction mechanism, or (ii) using a combined scoring that requires consensus from all performed comparison.

Scores may be also computed for block gaps. A block gap score may be computed based on a coherence difference between k blocks before the gap and k blocks after the gap. Such a block gap score aims to distinguish possible shifts in communication strata within an input document.

A coherence difference may be computed taking into account at least one of syntactic, lexical, or semantic information. Alternatively, or in addition thereto, rules that hold for the k blocks before the gap and the k blocks after the gap might be considered. For example, a block gap score may be computed as follows: the set of k blocks before and the set of k blocks after the gap, each one being represented as a vector of features. Each feature may correspond to syntactic, lexical, or semantic information or rules, and its value may show, for example, the number of times a specific feature occurs in the block set or the strength of a specific feature in the block set. For example, a feature that corresponds to a rule that captures user actions may show the number of times the rule holds in the block set. The block gap score may be computed by a function of two feature vectors. For example, a block gap score might be computed as 1−cosine (b1, b2), where b1 is the feature vector of the k blocks before the gap and b2 is the feature vector of the k blocks after the gap.

After the comparison at block 604, upon determining that blocks can be merged, blocks are merged as belonging to the same segment. More specifically, at block 606, it can be assessed whether blocks can be merged into the same segment based on the comparison at block 604. How the assessment at block 606 is performed generally depends on the type of comparison at block 608. For example, if the comparison at block 606 is based on a computed similarity of two blocks, then at block 608 can assess that blocks can be merged if the computed similarity is above a selected threshold.

As another example, if the comparison at block 606 is based on scores of block gaps, the block gaps are then applied to determine borders delimiting mergeable blocks (i.e. blocks belonging to the same communication strata). An approach for determining when to keep a gap or not may be to determine a standard deviation a of the computed set of gap scores. For each gap score, it may be then determined whether the score is within the interval [σ−c, σ+c], c being a selected constant. If it is within the interval, then the gap will be removed and the k blocks before and after the gap that were described in the gap score will be merged.

If at block 606 it is determined that blocks are mergeable, these blocks can be merged as belonging to the same segment at block 608, and a further iteration of blocks 602 to 606 may be performed using variable size window over the document tokens (block size may be varied at block 609). As the merging assessment is being performed, it can be determined whether similarity scores significantly vary for set of blocks that are already merged. Variations in the similarity may indicate that merged blocks should belong to different segments.

If at block 606 it is determined that blocks are not mergeable (for example because of a low similarity score), then process flow 600 may have come to a final determination as to which portions of the document belong to the different document communication strata.

It will be understood that there are a plurality of alternatives for implementing segmentation according to message types. For example, variable blocks may be generated by applying a variable window and a segmentation step to the input document. The variable blocks may be implemented similarly as illustrated above with respect to block 602. Thereby, a moving average for classification of the variable blocks is generated (e.g., a lexical classification, a key-term representation, a semantic classification, or a combination thereof). Then, blocks may be compared to assess whether blocks belong to the same input document segment. This comparison may be performed similarly as set forth above with respect to FIG. 6. Then, blocks that belong to the same input document segment may be merged. This merging may be performed similarly as set forth above with respect to block 608. The generating, the comparing, and the merging may be iterated over a variable block window so as to generate the input document segments. Thereby, an optimization procedure is used to determined segments of a document that correspond to communication strata.

Figure 7:
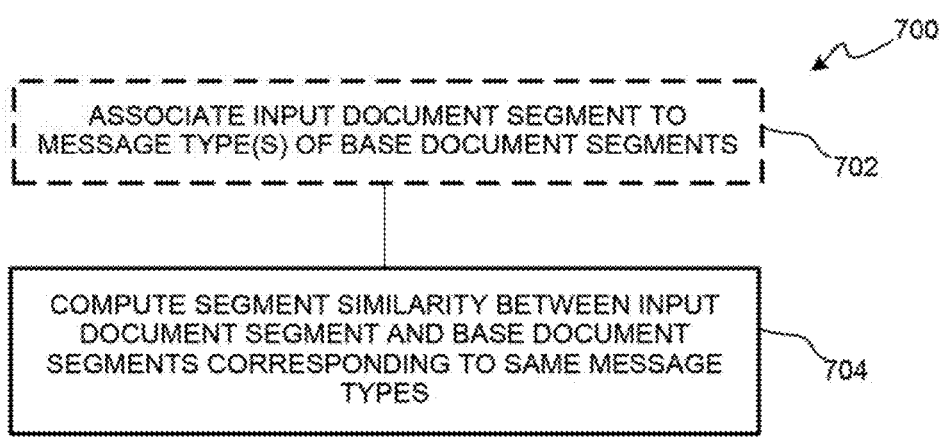
FIG. 7 shows a flow diagram 700 that illustrates examples to compute segment similarities.

FIG. 7 shows a flow diagram 700 that illustrates examples to compute segment similarities. Flow diagram 700 may include a pre-processing at which, input document segments are associated to message types, as illustrated by block 702. For example, referring to FIG. 1, input document segments 118 can be associated to message types from a base document segment repository. Previously, a set of message types from base document segment repository 124 may be derived, for example, as illustrated below with respect to FIG. 8.

Block 702 may include a classification of input document segments into communication strata derived from the base document collection. In principle, any suitable classification method may be used. For example, a number of binary classifiers and/or a decision tree can be implemented to determine associations between input document types and message types. Natural language patterns, topics, and/or topics that are representative of a message type may be used as characteristic features for implementation of the classifiers. Natural language patterns capture as their name conveys patterns in language. Natural language patterns may be described as word sequences, regular expressions, templates or the like. Further, natural language patterns may be linked to specific relations. For example, <NAME> was born in <BIRTHDATE>, is an example of a natural language pattern that expresses a relation of NAME with BIRTHDATE.

At block 704, a segment similarity can be computed between the input document segment and the base document segments associated thereto at block 702. That is, the segment similarity is computed with respect to base document segments corresponding to the same message type. This similarity computation may be seen as an intra-strata comparison, in which an input document segment (e.g. a new post in a forum) is compared to base document segments from an existing document collection that are at the same communication stratum. In principle, at block 704, any suitable text similarity method may be used to perform the computation, for example, but not limited to, a cosine similarity method.

Figure 8:
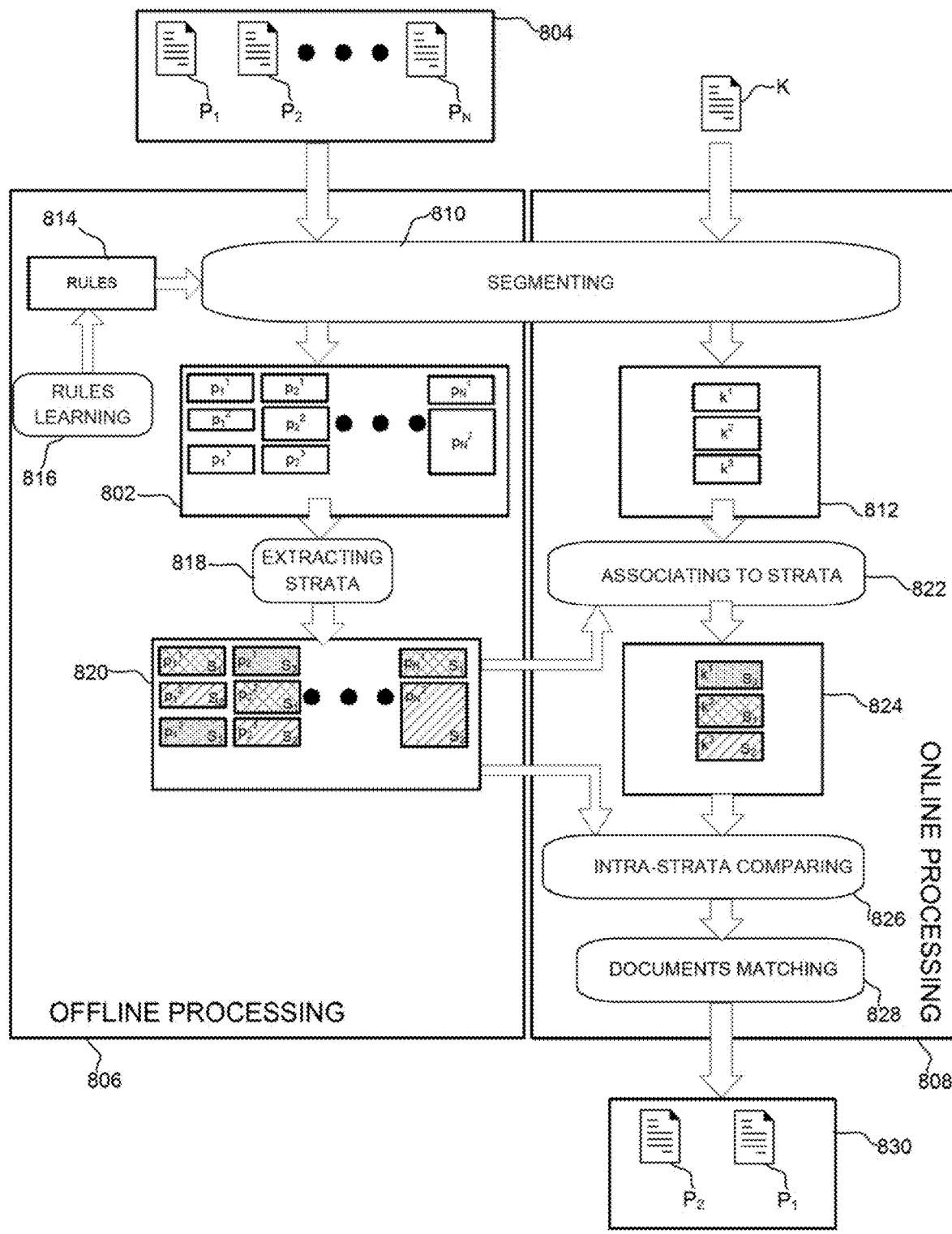
FIG. 8 depicts a flow chart illustrating examples of generating a set of base documents and a set of message types derived from a document collection and matching an input document to documents in the document collection based on the generated sets of base documents and a set of message types.

FIG. 8 shows a flow chart 800 illustrating examples of generating a set of base documents 802 and a set of message types derived from a document collection 804 and matching an input document K to documents in the document collection based on the generated sets of base documents and a set of message types. In the illustrated example, document collection 804 includes documents $P_1$ to $P_N$. Flow chart 800 is derived in (i) an offline processing 806 in which the set of base documents and message types are derived, and (ii) an online processing 808 in which an input document K is processed to be matched with documents in document collection 804. More specifically, in an offline processing, documents from a document collection (e.g., user entries in a forum) are segmented and clustered into communication strata by an association of document segments to message types. In an online processing, a new document (e.g. a new user entry in a forum) is matched to existed documents based on the communication strata identified in the offline processing.

At block 810, document $P_1$ to $P_N$ from document collection 804 are segmented. As illustrated by flow chart 800, the same segmenting 810 may be used to generate base document segments 802 and input document segments 812. The used segmenting procedure may be as illustrated above with respect to FIG. 6. As illustrated above a set of rules 814 are applied to the segmenting 810. A rule learning block 816 dynamically modifies rules 814 as new documents are processed to involve, for example, either explicit input from an expert user that encodes rules into set of rules 814 or implement semi-supervised processes to automatically modify or generate rules into set of rules 814.

As a result of segmenting 810 document collection 804, a set of base documents 802 is generated. For example, from base document $P_1$, base document segments $p_1^1$, $p_1^2$, and $p_1^3$ are generated; from base document $P_2$, base document segments $p_2^1$, $p_2^2$, and $p_2^3$ are generated; from base document $P_N$, base document segments $p_N^1$ and $p_N^2$ are generated. Such a base document segment set may be used as a base document repository (illustrated above in FIG. 1 as element 124).

At block 818, message types associated to base document set 802 are extracted. Block 818 can be seen as an extraction of communication strata from document collection 804. As a result of the extracting 818, base document segments are associated to message types. For example, the set of base document segments and the set of message types may be clustered together to form a repository of communication strata 820.

In the extracting 818, communication strata may not be pre-defined and assigned dynamically. Thereby, a data-driven approach may be followed to dynamically duster together base segments that are associated to the same message type, e.g. base segments that serve the same purpose from a user perspective. This might be seen as a strata clustering processing.

As an illustration of a strata clustering, a divisive process based on hierarchical partitioning may be used. For example, the divisive process may start with an initial cluster composed of all segments in base document segment 802. Then, the divisive process may iteratively refine the initial duster into a number of k dusters which represent semantic strata in document collection 804.

The parameter k may be pre-selected to an upper limit of duster number so that the communication strata from a specific document collection makes sense. This might be in particular advantageous for document collections in which a relatively low number of communication strata is more likely. For example, in a user support forum, it is more likely that a user communicates a problem using a relatively small number of strata since message types that a user may use (for example, "to express a problem" or "make a request to the community") are limited to the functionality of a support forum.

In contrast to clustering approaches aimed to content representation, strata clustering may not be based exclusively in comparing document segments based on content similarity, but rather based on the type of message associated with the document segments. For example, referring to Table 1 above, posts p1 and p4 may be clustered together by a content clustering but not by a strata clustering. In contrast thereto, posts p1 and p3 may be clustered together by a strata clustering but not by a content clustering.

Therefore, extracting 818 may include a strata clustering process based on a number of criteria that are based on identification of message types associated to document segments. For instance, any of the following criteria (a combination thereof may also be used).

(i) Segments in the same duster should be covered by a minimum number of common topics. In other words, a criteria may be used in which it is required a minimum number of frequent topics that can fully describe all segment in the same cluster.

(ii) Segments in the same duster should be covered by a minimum number of patterns (e.g. linguistic rules or templates). Examples of patterns may be linguistic templates such as "How to"+Verb, "I have"+Verb, or the like. To facilitate segment comparison based on such patterns, a pattern extraction method may be applied to mine frequent patterns in document collection 804.

Other examples of criteria that might be applied to perform clustering include, but are not limited to, representing segments as a vector of features. Each feature may correspond to syntactic, lexical, or semantic information or rules. Thereby, segments can be clustered based on the similarity of their feature representation. Clustering may be performed until an obviously unrelated topic(s) dominates a text block. For example, rules such as "combine until contradicted" or "not combine when similar" may be applied.

A final decision on segment clustering may be based on a combination of clustering evidence from the different criteria. Different types of evidence may be assigned with a different weight. As a further step, a combination of topics and patterns may be used to describe a cluster, i.e., a communication strata. Alternatively, or in addition thereto, an expert user may be involved to examine the clusters and assign descriptions that are displayed to end-users.

In the example illustrated in FIG. 8, document segments $p_1^1$, $p_2^2$, and $p_N^1$ are clustered together as associated to message type $S_1$; further, document segments $p_1^2$, $p_2^3$, and $p_N^2$ are clustered together as associated to message type $S_2$; further, document segments $p_1^3$, and $p_2^1$ are clustered together as associated to message type $S_3$.

From the above, it can be understood that the illustrate offline processing 806 builds a repository of base document segments and base message types constituting clusters of communication strata. Online processing 808 may use the results of offline processing to match an input document K with document in document collection 804.

Generally, as set forth above, matching input document K documents in collection 804, input document K might be segmented at block 810. The segmenting of input document K is based on the type of message being intended to communicate so as to generate document segments 812 that correspond to specific message types. In the illustrated example, input document K is segmented into segments $k^1$, $k^2$, and $k^3$.

As illustrated by the example of FIG. 8, input document segments 812 may be generated using the same segmentation as for generating base document segments 802. Using the same segmenting procedure for input document K and base documents in collection 804 facilitates more rational results in the subsequent cross-strata comparison illustrated below since it provides the same foundation for the generation of document segments.

At block 822, input document segments 812 are associated to message types. This block might be seen as an association into communication strata of input segments 812. As illustrated by the example of FIG. 8, the associating at block 822 may include associating input document segments 812 into message types of base repository 820 (these base message types are derived from base document collection 804). Thereby, communication strata that are identified in offline processing 806 are associated to input document segments 812.

The associating at block 822 may include any suitable approach that brings into relation document segments and message types. For example, classification methods may be used in which message types are assumed a priory and includes a trained classifier capable of mapping input document segments 802 to message types. Examples of strata classifiers are set forth above with respect to FIG. 7.

Alternatively, or in addition thereto, clustering methods may be used. By clustering, input segments 812 may be clustered with base segments 820 so that each cluster corresponds to a message type. In general, an a priori knowledge of message types is not required. For example, it is not necessary that there is an a priori knowledge of the correspondence between dusters and message types.

Furthermore, assuming that a collection of documents pre-exists and new documents are generated, all these documents can be segmented and a clustering method may be used to create clusters that correspond to message types. Then, when a new document comes in either as a question or as a document to be added in the collection, a classification mechanism may be put in place to classify the new document segments to the message types (dusters). Alternatively, a classification method may be used for all documents thereby facilitating for an incremental processing from the start.

As a result of associating 822, input communication strata 824 are generated, in which input document segments 812 are assigned to message types already identified in offline processing 806. In the illustrated example, document segment $k^1$ is associated to message type $S_3$; document segment $k^2$ is associated to message type $S_1$; document segment $k^3$ is associated to message type $S_2$.

At block 826, intra-strata comparing is performed. In the intra-strata comparing, base document segments 802 and input document segments 812 in the same communication strata (i.e., associated to the same message type) are compared to establish segment similarities. For example, comparing 826 may include comparing each input document segment 812 to each base document segment 802 associated to the same message type. For example, input document segment $k^1$ may be compared to base document segments $p_1^3$, and $p_2^1$ as belonging to message type $S_3$; input document segment $k^2$ may be compared to base document segments $p_1^1$, $p_2^2$ and $p_N^1$ as belonging to message type $S_1$; input document segment $k^3$ may be compared to base document segments $p_1^2$, $p_2^3$ and $p_N^2$ as belonging to message type $S_2$.

The intra-strata comparing 826 may include computing document segment similarities between input document segments and base document segments corresponding to the same message type. Examples on how such similarity computing may be performed are illustrated above with respect to FIG. 7.

At block 828, input document K is matched to documents in document collection 804 based on the results of intra-strata comparing 826. For example, documents within document collection 804 may be ranked based on computed similarities at comparing 826. For example, for each base document an aggregated score may be computed as a weighted sum of segment similarity scores for each segment of the base document. The weights may be selected in consideration of the type of documents being processed. User input may be involved in assigning weights to each communication strata so as to better meet specific needs.

In the above examples, segments generated in view of message types may be based as a first-class citizen in determining the similarity between documents. Alternatively, other matching techniques (e.g. based on document topics) may be involved in the matching process. Multiple matching techniques may be combined by assigning weights for generating a ranking or by presenting a user with different matching results corresponding to different matching approaches. In the example illustrated by FIG. 8, communication strata repository 820 and input communication strata 824 are used as first-class citizens in matching 828. Matching 828 generates a matching result 830 in which base document $P_2$ is ranked as the most relevant result, and based document $P_1$ is ranked as a secondary result.

Examples above may be applied for matching documents in a variety of environments. The illustrated approaches may be in particular effective for matching relatively short documents for which extraction of communication strata may be performed with a higher reliability. Examples of such short documents may be user entries into forums, user reviews, emails, or the like.

Support forums are particularly important for companies as they provide a platform for users to communicate their problems and for the company to understand gaps and educate their customers better on the company's products. At least some of the examples above are particularly effective for matching documents in such support since they facilitate a user to describe problem and locate posts that describe the same or similar problems. Hence, a waiting time for answers may be eliminated. Further, such examples may additionally provide insights about search results and help the user navigate into the results more effectively. By increasing the rate at which users locate relevant forum entries, there is not only an increase on user satisfaction and quality of the provided service, but it also facilitates an increase in the quality of questions and answers in a forum by preventing users to repeat similar questions that may generate clutter both for end users as well as experts. Moreover, it may also facilitate saving time to forum experts that usually provide help on a voluntary basis and focus into new problem posted in the forum.

Regarding review sites, there users look through reviews to, for example, book hotels, buy a new product, or attend an event. At least some of the examples herein facilitate searching for reviews that are meaningful to a user. Further, such examples may also facilitate that user can quickly identify reviews that are important from a provider's perspective. For example, a provider may identify reviews that pinpoint real problems instead of unsubstantial complaints.

It will be understood that examples herein are not limited to the above mentioned applications but that they may be applied to a variety of document types.

It will be appreciated that examples above can be realized in the form of hardware, programming or a combination of hardware and the software engine. Any such software engine, which includes machine-readable instructions, may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of a tangible computer-readable storage medium that are suitable for storing a program or programs that, when executed, for example by a processor, implement embodiments. Accordingly, embodiments provide a program comprising code for implementing a system or method as claimed in any preceding claim and a tangible or intangible computer readable storage medium storing such a program. A tangible computer-readable storage medium is a tangible article of manufacture that stores data. (It is noted that a transient electric or electromagnetic signal does not fit within the former definition of a tangible computer-readable storage medium.)

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations.

Further, flow charts herein illustrate specific block orders; however, it will be understood that the order of execution may differ from that which is depicted. For example, the order of execution of two or more blocks may be scrambled relative to the order shown. Also, two or more blocks shown in succession may be executed concurrently or with partial concurrence.

Further, claims reciting "a" or "an" with respect to a particular element contemplate incorporation of one or more such elements, neither requiring nor excluding two or more such elements. Further, at least the terms "include" and "comprise" are used as open-ended transitions. Further, some elements in the description above are described as configured to perform a specific function. It will be understood that an element configured to perform a certain function is not just merely capable of performing that function but is actually designed to the particular use, purpose, or situation. For example, an engine configured to perform a certain function may include a mixture of hardware and software designed and implemented to perform that function.

What is claimed is:

1. A method to automatically match an input document with a document collection using a processor, comprising:
   segmenting, by the processor, the input document into input document segments based on the type of message being intended to communicate so as to generate document segments that correspond to specific message types, wherein segmenting is performed iteratively to generate input document segments;
   identifying a communication stratum of at least one input document segment, wherein a communication stratum indicates previous actions to resolve an issue;
   accessing, by the processor, base document segments extracted from a document collection stored in a machine readable medium;
   associating, by the processor, the input document segments and base document segments to message types using clustering analysis, wherein:

segments are represented as a vector of features, each feature comprising syntactic, lexical, or semantic information or rules; and segments are clustered based on the similarity of features in the vector of features;

computing document segment similarities, by the processor, by comparing input document segments with base document segments corresponding to the same message type; and matching, by the processor, the input document with base documents in the document collection based on the computed document segment similarities.

2. The method of claim 1, wherein the associating includes associating the input document segments into message types derived from the document collection.

3. The method of claim 1, wherein the segmentation includes:

generating variable blocks by applying a variable window and a segmentation step to the input document whereby a moving average for lexical classification is generated;

comparing blocks to assess whether blocks belong to the same input document segment; and merging blocks that belong to the same input document segment.

4. The method of claim 1, wherein the input document segments are generated using the same segmentation as for the base document segments.

5. The method of claim 1, wherein the matching includes ranking of base documents in the document collection using a ranking function based on the computed document segment similarities.

6. The method of claim 1, further comprising iteratively clustering the base document segments within a message type to form a plurality of clusters with a given message type.

7. The method of claim 1, further comprising a set of instructions to identify a title to the document.

8. The method of claim 7, wherein the title is a communication stratum.

9. The method of claim 1, further comprising a set of instructions to identify a problem summary at a start of a document.

10. The method of claim 9, wherein the problem summary is a communication stratum.

11. A computer software product comprising a non-transitory, tangible medium readable by a processor, the medium having stored thereon a set of instructions for establishing a similarity correspondence between an input document and one or more documents in a base document collection, the instructions comprising:

a set of instructions which, when loaded into a memory and executed by the processor, causes providing a set of base document segments and a set of message types associated to base document segments in the set of base document segments, the set of base document segments being derived from documents in the base document collection, the generating of the base document segments including:

segmenting documents in the base document collection to generate the set of base document segments; and extracting from the set of base document segments associated message types so as to generate the set of message types, wherein the set of base document segments and the set of message types are clustered together, wherein base document segments are represented as a vector of features, each feature comprising syntactic, lexical, or semantic information or rules; and clustering base document segments based on similarity of features in the vector of features;

a set of instructions which, when loaded into a memory and executed by the processor, causes segmenting the input document into input document segments corresponding to message types; and a set of instructions which, when loaded into a memory and executed by the processor, cause computing segment similarity between input document segments and base document segments corresponding to the same message types, whereby the similarity correspondence between the input document and at least one document in the base document collection is based on the computed segment similarity.

12. The product of claim 11, wherein the segmenting corresponds to a procedure used to segment documents in the base document collection into the set of base document segments.

13. The product of claim 11, wherein the segmenting includes an iterative process that starts by initial selection of a selected block selection and refines the selected block to identify segments in the input document that correspond to message types.

14. The product of claim 11, wherein the segmenting includes:

segmenting the input document into blocks with selected size;

comparing the blocks to assess whether the blocks can be merged as corresponding to the same message type; and upon determining that blocks can be merged, merging the block as belonging to the same segment.

* * * * *